(12) United States Patent
Selvarajan et al.

(10) Patent No.: US 9,927,864 B2
(45) Date of Patent: Mar. 27, 2018

(54) MULTIPLE LINK POWER ALLOCATION SYSTEM

(71) Applicant: Dell Products L.P., Round Rock, TX (US)

(72) Inventors: Rajasekar Vannierpalayam Selvarajan, Tamilnadu (IN); Narayana Swamy Perumal, Chennai (IN)

(73) Assignee: Dell Products L.P., Round Rock, TX (US)

( * ) Notice: Subject to any disclaimer, the term of this patent is extended or adjusted under 35 U.S.C. 154(b) by 227 days.

(21) Appl. No.: 14/317,292

(22) Filed: Jun. 27, 2014

(65) Prior Publication Data

US 2015/0378428 A1  Dec. 31, 2015

(51) Int. Cl.
*G06F 1/32* (2006.01)

(52) U.S. Cl.
CPC .......... *G06F 1/3293* (2013.01); *G06F 1/3209* (2013.01); *G06F 1/3218* (2013.01); *G06F 1/3278* (2013.01)

(58) Field of Classification Search
CPC .... G06F 1/3209; G06F 1/3218; G06F 1/3278; G06F 1/3293
See application file for complete search history.

(56) References Cited

U.S. PATENT DOCUMENTS

| | | | | |
|---|---|---|---|---|
| 8,793,511 B1* | 7/2014 | Bishara | ................... | G06F 1/266 713/300 |
| 9,256,263 B1* | 2/2016 | Narayanan | ................ | G06F 1/30 |
| 9,319,537 B2* | 4/2016 | Peker | ................... | H04M 19/003 |
| 2006/0053324 A1* | 3/2006 | Giat | ........................ | H04L 12/10 713/300 |
| 2006/0218415 A1* | 9/2006 | Mak-Fan | ................ | G06F 1/266 713/300 |
| 2007/0136614 A1* | 6/2007 | Heath | ..................... | H04L 12/10 713/300 |
| 2007/0237322 A1* | 10/2007 | Hussain | ............ | H04L 12/40045 379/413 |
| 2008/0005602 A1* | 1/2008 | Diab | ........................ | G06F 1/266 713/300 |
| 2008/0052546 A1* | 2/2008 | Schindler | ................ | G06F 1/266 713/300 |
| 2008/0114998 A1* | 5/2008 | Ferentz | ................... | H04L 12/12 713/324 |

(Continued)

*Primary Examiner* — Thomas Lee
*Assistant Examiner* — Mohammad A Rahman
(74) *Attorney, Agent, or Firm* — Haynes and Boone, LLP (57) ABSTRACT

A multiple link power allocation system includes a powered IHS coupled to a powering IHS by a plurality of networking cables that transmit data and power to provide a plurality of data/power links. The powering IHS may detect that the data/power links are connected to the powered IHS, determine a total power amount needed by the powered IHS, and provide the total power amount to the powered IHS using the data/power links. The powered IHS may detect the connection of an initial data/power link, enable a first powered IHS function mode and, in response, draw a first power amount through the initial data/power link. The powered IHS may also detect the connection of subsequent data/power link(s), enable a second powered IHS function mode and, in response, draw a second power amount through the initial data/power link and the subsequent data/power link(s) that is greater than the first power amount.

20 Claims, 8 Drawing Sheets

(56) References Cited

U.S. PATENT DOCUMENTS

| | | | | |
|---|---|---|---|---|
| 2008/0168283 | A1* | 7/2008 | Penning | G06F 1/263 713/310 |
| 2008/0172564 | A1* | 7/2008 | Diab | H04L 12/10 713/300 |
| 2008/0235523 | A1* | 9/2008 | Hussain | H04L 12/66 713/300 |
| 2009/0055672 | A1* | 2/2009 | Burkland | H04L 12/10 713/340 |
| 2012/0198246 | A1* | 8/2012 | German | H04Q 1/136 713/300 |
| 2013/0311793 | A1* | 11/2013 | Chang | G06F 1/206 713/300 |
| 2013/0339760 | A1* | 12/2013 | Zimmerman | G06F 1/26 713/300 |
| 2014/0245054 | A1* | 8/2014 | Hamdi | G06F 11/3062 713/340 |
| 2015/0121095 | A1* | 4/2015 | Tsai | G06F 13/00 713/310 |
| 2015/0127957 | A1* | 5/2015 | Sethi | H04L 12/10 713/300 |

* cited by examiner

MULTIPLE LINK POWER ALLOCATION SYSTEM

BACKGROUND

The present disclosure relates generally to information handling systems, and more particularly to systems and methods for allocating power to information handling systems using multiple links.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs such as, for example, switch or networking IHSs, are configured to provide power to other IHSs through their ports and over networking cables using Power over Ethernet (PoE, PoE+, etc.) systems and components. For example, the Institute of Electrical and Electronics Engineers (IEEE) standards 802.3af and 802.3at define the specifications that describe how power may be provided over a single Ethernet cable to an IHS.

To meet increasing data bandwidth demands, a switch IHS may be connected to a single connected IHS using multiple Ethernet cables connected between respective ports on the switch IHS and ports on the single connected IHS. The multiple links provided by those Ethernet cable connections may then be aggregated to form a link aggregation group (LAG) that increases the data throughput between the switch IHS and that single connected IHS. However, current PoE specifications only provide for the transmission of power over a single Ethernet link. When more than one link in a LAG is configured to provide power using PoE systems and components, the PoE logic will operate to treat each of those links as a distinct and separate PoE link and cause each of those links to provide the same amount of power to the single connected IHS, which leads to inefficient power allocation by the switch IHS. In order to avoid such inefficiencies, users typically configure only one of the links in the LAG to provide power, which can raise issues with regard to power supply to the single connected IHS if that link fails. Furthermore, due to physical characteristics of the Ethernet cables that provide Ethernet links, an upper limit exists on the amount of power that may be conventionally transmitted from the switch IHS to the single connected IHS. For example, even conventional high power transmission Ethernet cables that transmit power over 4 wires are limited to transmitting up to approximately 60 watts of power, as the physical characteristics of those Ethernet cables result in Ethernet cable heating issues at higher power transmission amounts.

Accordingly, it would be desirable to provide an improved multiple link power allocation system.

SUMMARY

According to one embodiment, a powering information handling system (IHS), includes a plurality of data/power ports that are each configured to transmit data and power; a processing system that is coupled to the plurality of data/power ports; and a memory system that is coupled to the processing system and that includes instructions that, when executed by the processing system, cause the processing system to provide a power allocation engine that is configured to: detect that the plurality of data/power ports are connected to a powered IHS; determine a total power amount needed by the powered IHS; and provide the total power amount to the powered IHS through the plurality of data/power ports.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
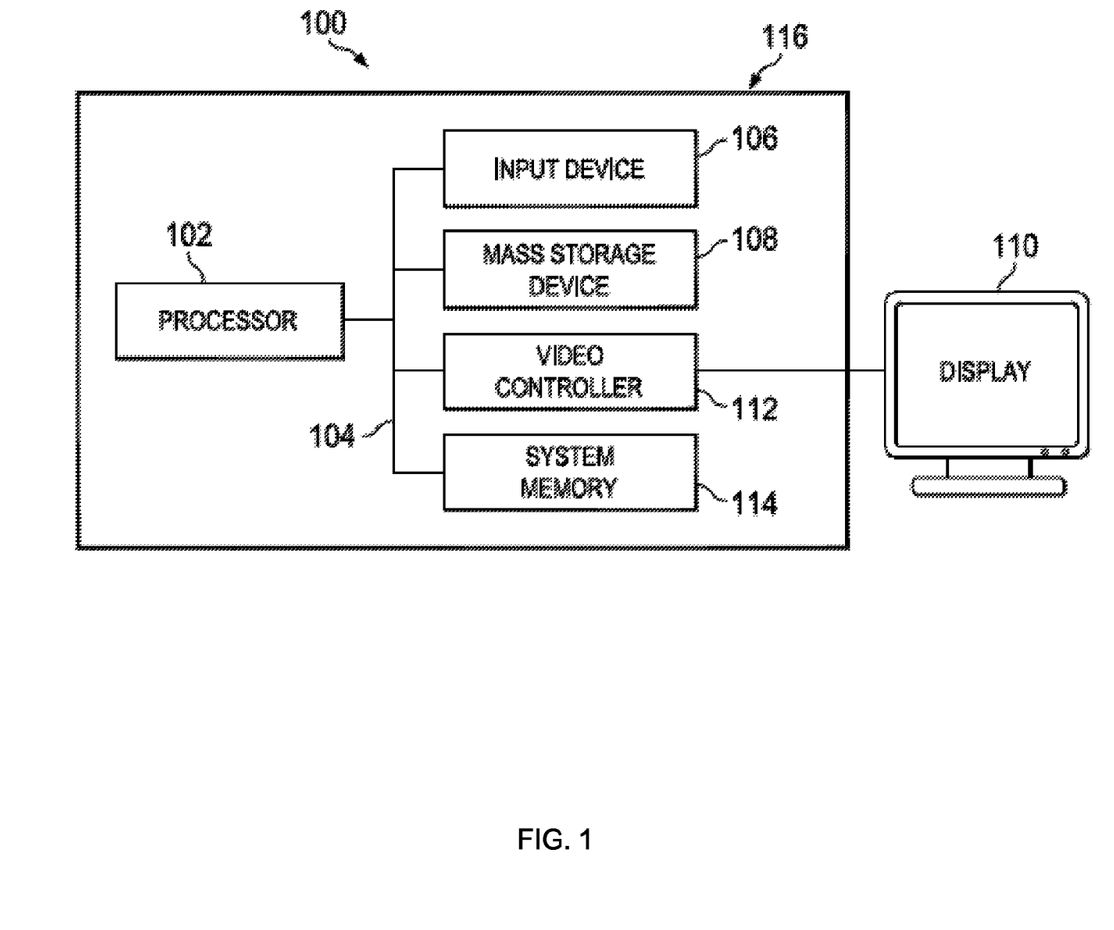
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
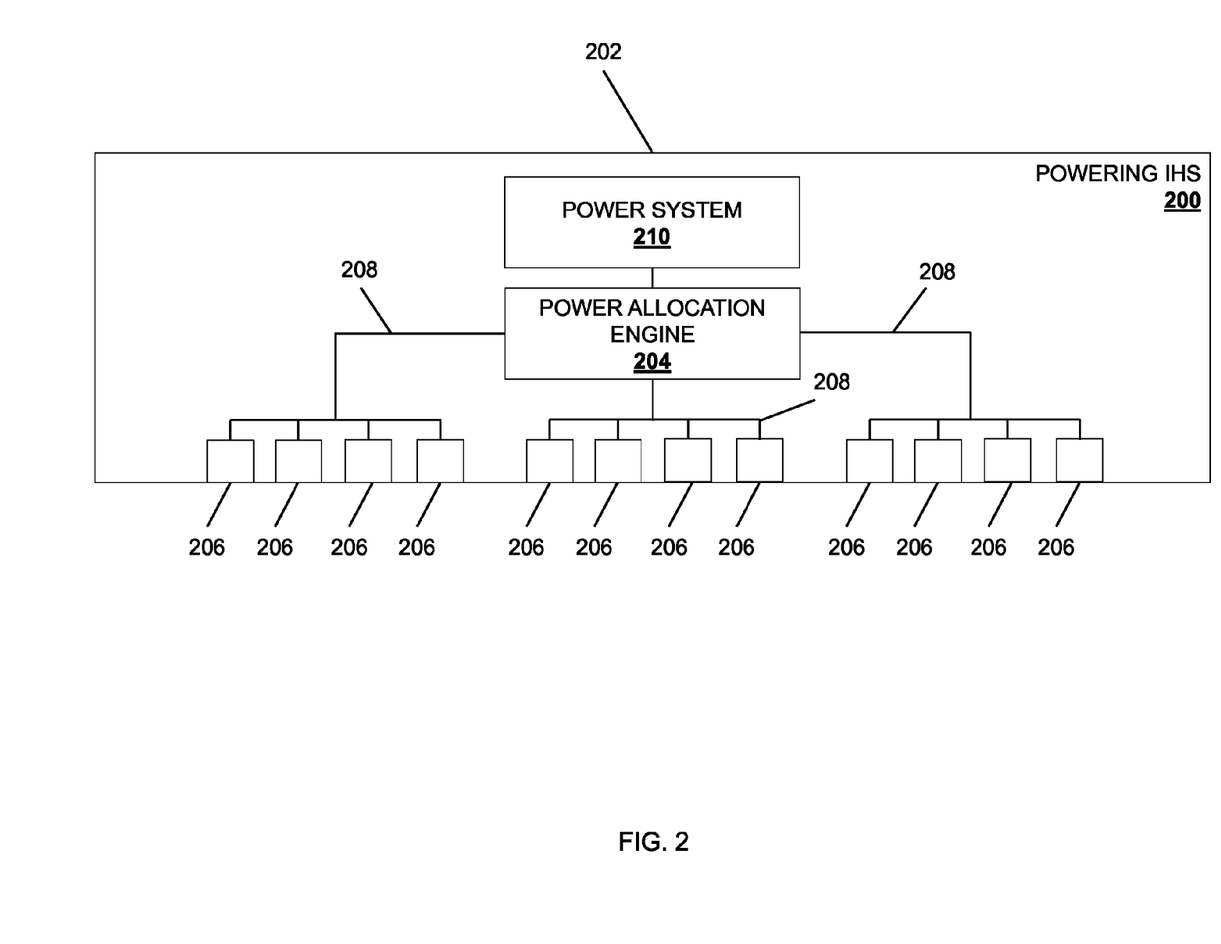
FIG. 2 is a schematic view illustrating an embodiment of powering IHS.

Referring now to FIG. 2, an embodiment of a powering IHS 200 is illustrated. In an embodiment, the powering IHS 200 may be the IHS 100 discussed above with reference to FIG. 1 and/or include some or all of the IHS components of the IHS 100. In the embodiments illustrated and described below, the powering IHS 200 is a switch IHS such as, for example, a "pizza box" form factor switch IHS, a chassis-based switch IHS, and/or a variety of other switch IHS's known in the art that are configured to provide power as well as data over networking ports and networking cables to a powered IHS, discussed in further detail below. However, the powering IHS 200 may be any type of IHS such as, for example, a laptop/notebook IHS, a desktop IHS, a tablet IHS, a phone IHS, a server IHS, a storage IHS, and/or a variety of other IHSs known in the art that may be configured to provide power as well as data over ports and cables to a powered IHS. The powering IHS 200 includes a chassis 202 that may be the chassis 116 discussed above with reference to FIG. 1. In the illustrated embodiment, the powering IHS 200 may include a processing system (e.g., the processor 102 discussed above with reference to FIG. 1) and a memory system (e.g., the system memory 114 discussed above with reference to FIG. 1) that includes instruction that, when executed by the processing system, cause the processing system to provide a power allocation engine 204 that is configured to perform the functions of the power allocation engines and powering IHSs discussed below, as well as a data transmission engine (not illustrated) that is configured to transmit data as discussed below. The powering IHS 200 also includes a plurality of data/power ports 206 that are located adjacent a surface of the chassis 202, and that are connected to the power allocation engine 204 (e.g., the processing system that provides the power allocation engine 204) by one or more data/power buses 208. In an embodiment, the data/power ports 206, data/power buses 208, and/or other powering IHS components are configured to transmit data and power according to Power over Ethernet (PoE, PoE+, etc.) standards and/or other powering standards known in the art. The powering IHS 200 also includes a power system 210 that may include one or more power supply units, power adapters, power connectors that are configured to couple to power sources, batteries, and/or any of a variety of other power system components known in the art.

Figure 3:
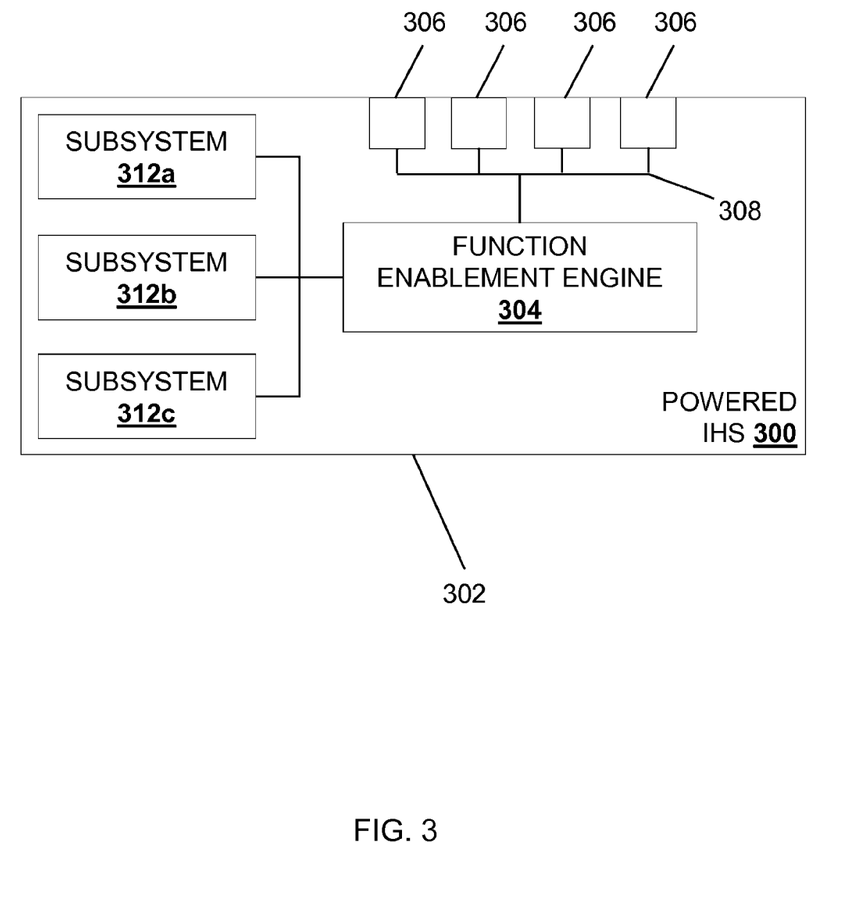
FIG. 3 is a schematic view illustrating an embodiment of powered IHS.

Referring now to FIG. 3, an embodiment of a powered IHS 300 is illustrated. In an embodiment, the powered IHS 300 may be the IHS 100 discussed above with reference to FIG. 1 and/or include some or all of the IHS components of the IHS 100. In the embodiments illustrated and described below, the powered IHS 300 is a camera IHS that includes high-definition image capturing and movement capabilities, and that is configured to receive power as well as data over networking ports and networking cables from a powering IHS, discussed in further detail below. However, the powered IHS 300 may be any type of IHS such as, for example, a laptop/notebook IHS, a desktop IHS, a tablet IHS, a phone IHS, a server IHS, a storage IHS, any of a plurality of peripheral IHSs, a WiFi router, a modem, any of a variety of access points, and/or a variety of other IHSs known in the art that are configured to receive power as well as data over ports and cables from a powering IHS. The powered IHS 300 includes a chassis 302 that may be the chassis 116 discussed above with reference to FIG. 1. In the illustrated embodiment, the powered IHS 300 may include a processing system (e.g., the processor 102 discussed above with reference to FIG. 1) and a memory system (e.g., the system memory 114 discussed above with reference to FIG. 1) that includes instruction that, when executed by the processing system, cause the processing system to provide a function enablement engine 304 that is configured to perform the functions of the function enablement engines and powered IHSs discussed below, as well as a data transmission engine (not illustrated) that is configured to transmit data as discussed below. The powered IHS 300 also includes a plurality of data/power ports 306 that are located adjacent a surface of the chassis 302, and that are connected to the function enablement engine 304 (e.g., the processing system that provides the function enablement engine 304) by one or more data/power buses 308. In an embodiment, the data/power ports 306, data/power buses 308, and/or other powered IHS components are configured to receive data and power according to Power over Ethernet (PoE, PoE+, etc.) standards and/or other powering standards known in the art.

The powered IHS 300 also includes a plurality of IHS subsystems 312a, 312b, and up to 312c. In different embodiments, the IHS subsystems 312a-c may include any of a variety of powered IHS components known in the art that may provide different levels of IHS functionality, discussed in further detail below. For example, the function enablement engine 304 may store (e.g., in the memory system) a plurality of different powered IHS function modes that utilize different IHS subsystems and/or subsystem functionality to provide different functionality for the powered IHS 300. As such, a database of powered IHS function modes, the IHS subsystems and/or subsystem functionality used in those powered IHS function modes, the power required to operate in those powered IHS function modes, and/or a variety of other information that will be apparent to one of skill in the art in possession of the present disclosure, may be included in the function enablement engine 304 to provide the functionality discussed below with regard to the method 700 illustrated in FIG. 7. In some embodiments, the plurality of powered IHS function modes may divide the powered IHS functionality based on different power requirements for those powered IHS function modes. For example, a first powered IHS function mode may require the minimum amount of power needed to operate the basic functions of the powered IHS 300, while any additional powered IHS function modes may require additional power to operate increasingly more advanced functions of the powered IHS 300. In some embodiments, the first powered IHS function mode may require at most the amount of power available through a single network cable, while additional powered IHS function modes may require an amount of power available through multiple network cables. Some examples of devices that draw relatively large amounts of power and thus may particularly benefit from the teachings of the present disclosure include video conferencing POE+ powered switches, IP turrets used in banking and financial trading floor phone systems, building management for lighting fixtures and controller, high resolution pan-tilt-zoom cameras, and/or a variety of other relatively high power consumption devices known in the art.

Figure 4:
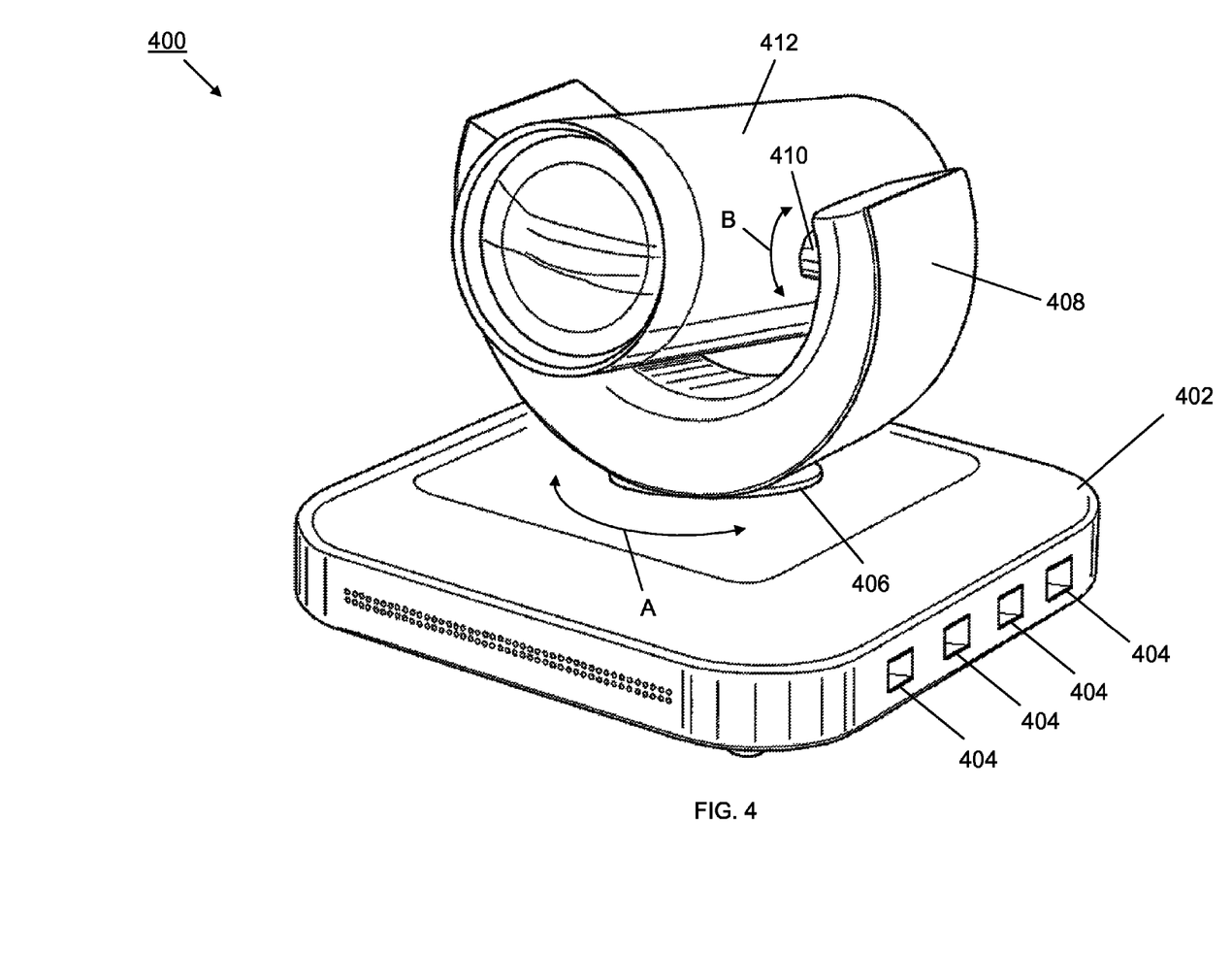
FIG. 4 is a perspective view illustrating an embodiment of powered IHS.

Referring now to FIG. 4, an embodiment of a powered camera IHS 400 is illustrated that may be the powered IHS 300 discussed above with reference to FIG. 3. The powered camera IHS 400 includes a base 402 that may house the function enablement engine 304 discussed above with reference to FIG. 3, as well as any of a variety of powered camera IHS components known in the art. A plurality of data/power ports 404, which may be the data/power ports 306 discussed above with reference to FIG. 3, are located on the surface of the base 402 and may be coupled to the function enablement engine 304. A first moveable coupling 406 is located on a surface of the base 402, coupled to a camera support member 408, and configured to move the camera support member 408 relative to the base 420 about a range of motion A. One or more second moveable couplings 410 extend between the camera support member 408 and a camera chassis 412 and are configured to move the camera chassis 412 relative to the camera support member 408 about a range of motion B. The camera chassis 412 and/or the base 402 may house camera IHS components such as a lens, a shutter, a processing system, a memory system, a storage device, and/or a variety of other camera IHS components known in the art. As discussed above, the powered camera IHS 400 may include high-definition image capturing capabilities that one of skill in the art would recognize may utilize high data transmission rates enabled by, for example, the data link aggregation groups (LAGs) discussed below.

In the illustrated embodiment, the first moveable coupling 406, second moveable coupling(s) 410, and the camera IHS components that provide the functionality of the camera IHS 400 may be considered powered IHS subsystems such as the IHS subsystems 312*a*-*c* discussed above with reference to FIG. 3. Furthermore, as discussed above, the function enablement engine 304 in the powered camera IHS 400 may store (e.g., in the memory system) a plurality of different powered IHS function modes that utilize the first moveable coupling 406, second moveable coupling(s) 410, and the camera IHS components functionality to provide different functionality for the powered camera IHS 400. In some embodiments, the plurality of powered IHS function modes may divide the powered camera IHS functionality based on different power requirements for those powered IHS function modes. For example, a first powered IHS function mode may require the minimum amount of power needed to operate the basic functions of the camera system of the powered camera IHS 400 (e.g., to power-on the powered camera IHS 400, to initialize the powered camera IHS 400, to capture images using the powered camera IHS 400, and/or to provide a variety of other basic functions known in the art), while any additional powered IHS function modes may require additional power to operate increasingly more advanced motion functions of the powered camera IHS 400 using the first moveable coupling 406 and/or the second moveable coupling(s) 410. In some embodiments, the first powered IHS function mode may require at most the amount of power available through a single network cable (e.g., 30 watts or less), while additional powered IHS function modes may require an amount of power available through multiple network cables (e.g., more than 30 watts).

Referring now to FIGS. 2, 3, 5, 6*a*, 6*b*, and 7, methods 500 and 700 for power allocation using multiple links are illustrated. As discussed below, the powering IHS 200 may perform the method 500 independently of the powered IHS 300, and the powered IHS 300 may perform the method 700 independently of the powering IHS 200. However, in some embodiments, the powering IHS 200 may perform the method 500 in cooperation with the performance of the method 700 by the powered IHS 300. As such, the performance of the method 500 by the powering IHS 200 will be discussed below as being performed independently of the powered IHS 300, and the performance of the method 700 by the powered IHS 300 will be discussed below as being performed independently of the powering IHS 200, but one of skill in the art in possession of the present disclosure will recognize how the methods 500 and 700 may be performed by the powering IHS 200 and powered IHS 300 in cooperation.

Figure 5:
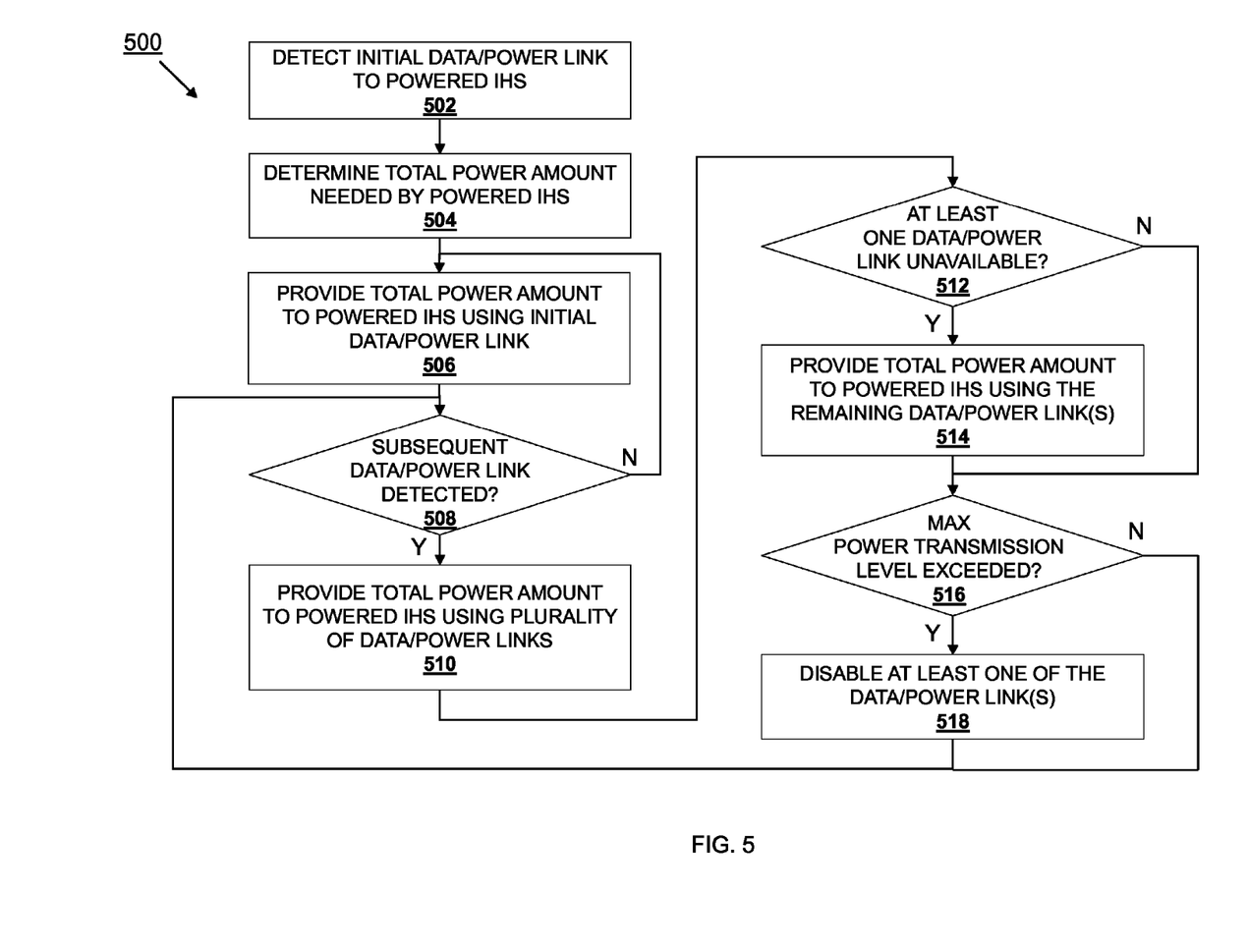
FIG. 5 is a flow chart illustrating an embodiment of a method for allocating power using multiple links.
Figure 6A:
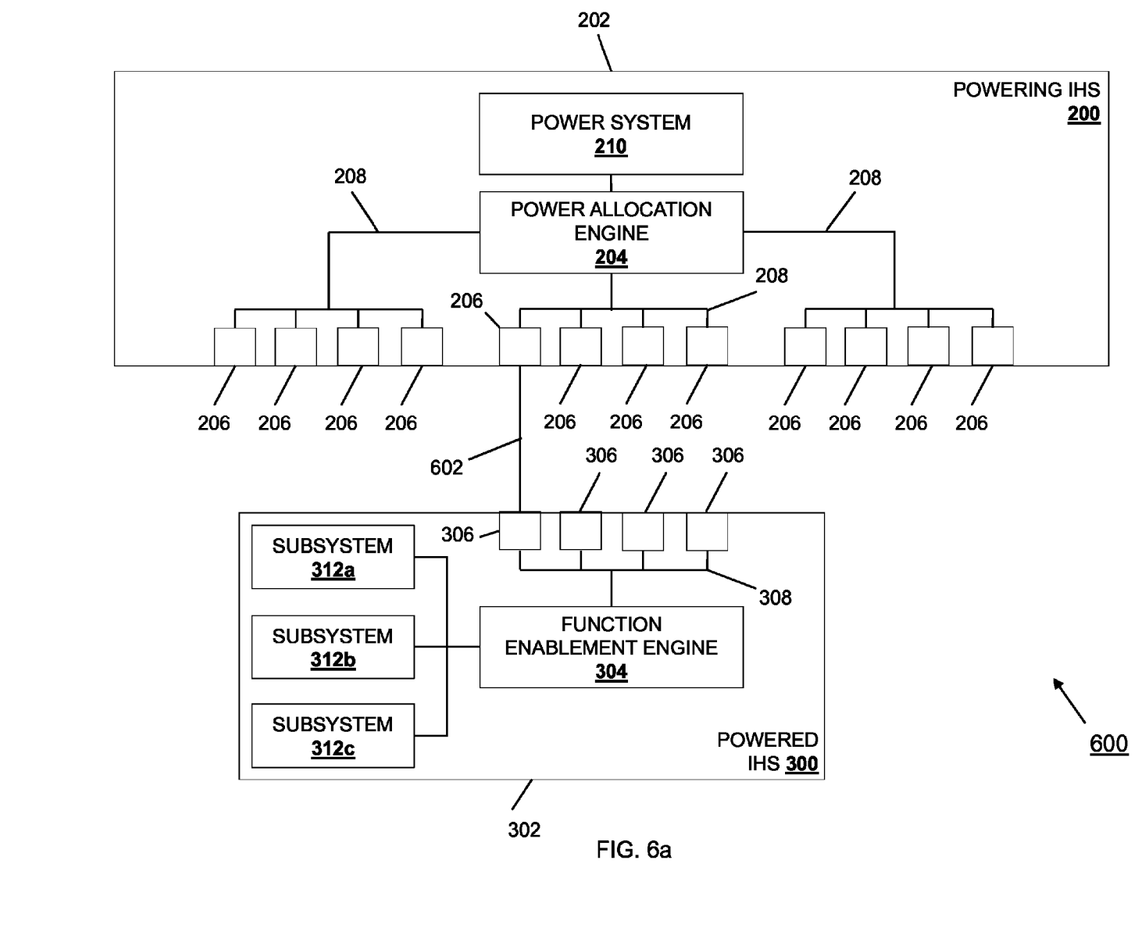
FIG. 6a is a schematic view illustrating a multiple link power allocation system including the powered IHS of FIG. 3 connected to the powering IHS of FIG. 2 by an initial data/power link.

The method 500 begins at block 502 where an initial data/power link to the powered IHS is detected. In an embodiment of block 502, the powering IHS 200 may detect an initial data/power link to the powered IHS 300 in response to the connection of a cable to a port on the powering IHS 200 and a port on the powered IHS 300. For example, FIG. 6*a* illustrates an embodiment of a multiple link power allocation system 600 in which a network cable 602 such as, for example, an Ethernet cable, has been connected to a data/power port 206 on the powering IHS 200 and a data/power port 306 on the powered IHS 300 (e.g., using connectors on either ends of the network cable 602). In response to the connection of the network cable 602 to the data/power ports 206 and 306, the power allocation engine 204 in the powering IHS 200 and the function enablement engine 304 in the powered IHS 300 may communicate using networking connection methods known in the art to create an initial data/power link between the powering IHS 200 and the powered IHS 300 that is configured to transmit data and power using, for example, PoE protocols, and that initial data/power link is detected by the power allocation engine 204 at block 502. The initial data/power link is distinguished in the embodiments discussed below from subsequent data/power links in that it is the first data/power link provided between the powering IHS 200 and the powered IHS 300. However, similar functionality performed using the initial data/power link may be performed using any data/power link that is the only data power/link between the powering IHS 200 and the powered IHS 300 (e.g., due to the failure or unavailability of other data/power links, discussed below).

The method 500 then proceeds to block 504 where a total power amount needed by the powered IHS is determined. In an embodiment, in response to or as part of the detection of the initial data/power link, the power allocation engine 204 may operate to exchange and/or retrieve information with the powered IHS 300 in order to determine a power amount needed by the powered IHS 300. For example, the power allocation engine 204 may include hardware that operates to detect a class of the powered IHS 300 (e.g., via a resister in the powered IHS 300 that indicates a power range for the powered IHS 300) at block 504, which in PoE systems may include class 0 powered IHSs that operate in a power range of 0.44-12.94 watts, class 1 powered IHSs that operate in a power range of 0.44-3.84 watts, class 2 powered IHSs that operate in a power range of 3.84-6.49 watts, class 3 powered IHSs that operate in a power range of 6.49-12.95 watts, and class 4 powered IHSs that operate in a power range of 12.95.25.50 watts. Furthermore, the detection of the initial data/power link at block 502 and the determination of the total power amount at block 504 may include other PoE link detection operations (e.g., detecting for a signature resistance in the powered IHS of 19.26.5 kΩ), classification operations, mark 1 operations, class 2 operations, mark 2 operations, and startup operations known in the art. As such, at block 504 the power allocation engine 204 may determine a total amount of power that should be provided to the powered IHS 300 using the initial data/power link.

In some embodiments, the network cable 602 may be limited in the amount of power that it may transmit. For example, conventional 802.3af network cables are configured to transmit a maximum of approximately 15 watts, while conventional 802.3at network cables are configured to transmit a maximum of approximately 30 watts, and conventional Universal PoE cables are configured to transmit a maximum of approximately 60 watts. In some embodiments, the power allocation engine 204 may take into account the maximum power transmission levels of the network cable hat is used to provide the initial data/power link in determining the total amount of power that should be provided to the powered IHS 300. For example, if a powered IHS requires 12 watts to operate and the initial power link is provided by a network cable that can transmit a maximum power amount of 15 watts, then a total power amount of 12 watts (or range that includes 12 watts) may be determined at block 504. However, if a powered IHS requires 21 watts to operate and the initial power link is provided by a network cable that can transmit a maximum power amount of 15 watts, then a total power amount of 15 watts may be determined at block 504. While a few examples have been provided, one of skill in the art will recognize that the determination of the total power amount or power range needed by the powered IHS 300 may be performed in a variety of manners while remaining within the scope of the present disclosure.

The method 500 the proceeds to block 506 where the total power amount is provided to the powered IHS using the initial data/power link. In an embodiment, the power allocation engine 204 may allocate the total amount of power from the power system 210 (e.g. received by the power system 210 from a battery, a wall plug connection, or other power source) and supply that total power amount to the port 206 that is connected to the initial data/power link such that the initial data/power link provides that total power amount to the powered IHS 300. In some embodiments, the total power amount provided at block 506 may be a power amount that is within a maximum power limit of the initial data/power link (e.g., the power allocation engine 204 may provide the total power amount over the initial data/power link up to the maximum power limit of the initial data/power link). Additionally, data communication systems (not illustrated) in the powering IHS 200 may operate to transmit data to, and receive data from, the powered IHS 300 through the initial data/power link.

The method 500 then proceeds to decision block 508 where it is determined whether a subsequent data/power link is detected. In an embodiment of decision block 508, the power allocation engine 204 may monitor the ports 206 on the powering IHS 200 to determine whether a network cable is connected to one of those ports 206 as well as a port on the powered IHS 300. If at decision block 508, the power allocation engine 204 determines that no subsequent data/power link has been detected, the method 500 returns to block 506 where the total power amount is provided to the powered IHS 300 using the data/power link in substantially the same manner as discussed above. If at decision block 508, the power allocation engine 204 determines that a subsequent data/power link has been detected, the method proceeds to block 510.

Figure 6B:
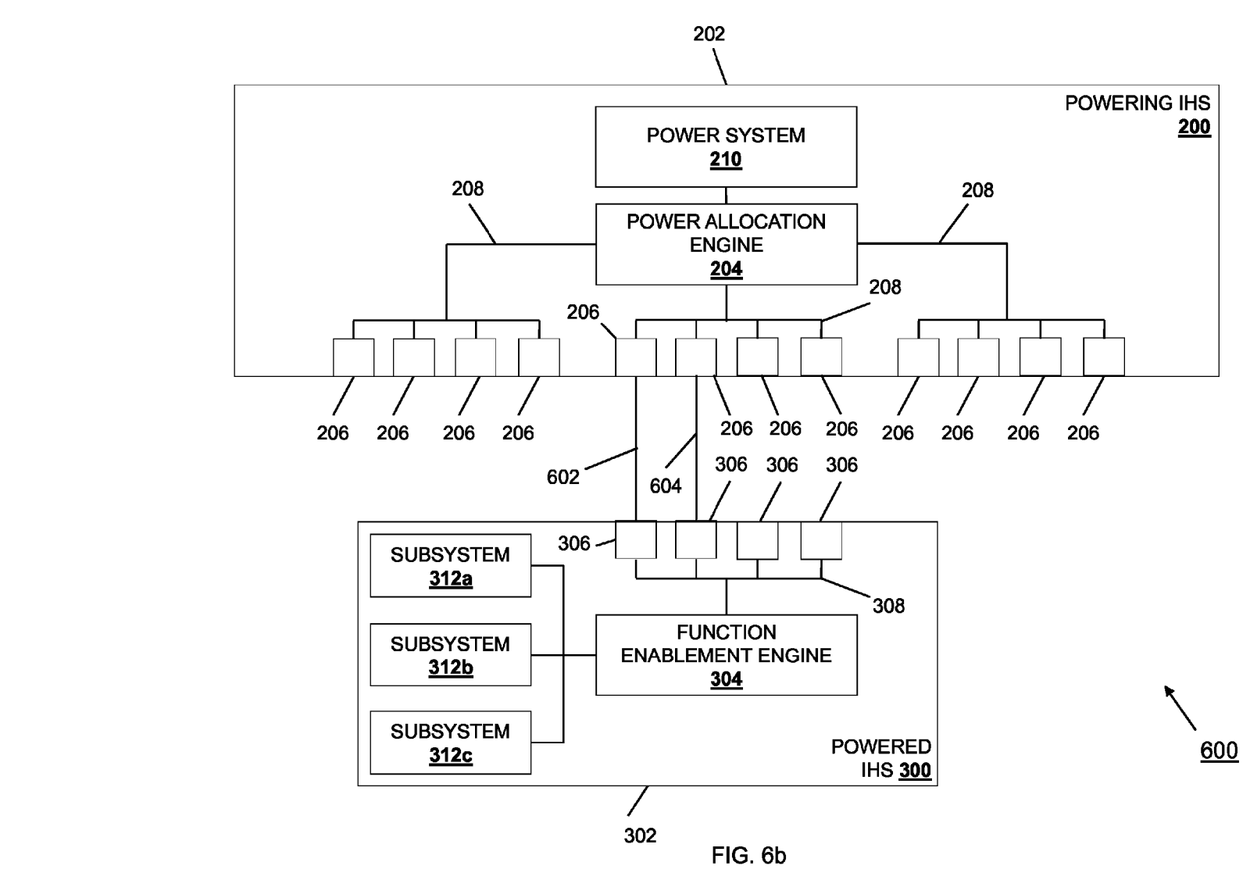
FIG. 6b is a schematic view illustrating a multiple link power allocation system including the powered IHS of FIG. 3 connected to the powering IHS of FIG. 2 by multiple data/power links.

In an embodiment of decision block 508, the powering IHS 200 may detect a subsequent data/power link to the powered IHS 300 in response to the connection of a cable to another port on the powering IHS 200 and another port on the powered IHS 300. For example, FIG. 6b illustrates an embodiment of the multiple link power allocation system 600 in which a network cable 604 such as, for example, an Ethernet cable, has been connected to another data/power port 206 on the powering IHS 200 (relative to the data/power port 206 connected to the network cable 602) and another data/power port 306 on the powered IHS 300 (relative to the data/power port 306 connected to the network cable 602). In response to the connection of the network cable 604 to the data/power ports 206 and 306, the power allocation engine 204 in the powering IHS 200 and the function enablement engine 304 in the powered IHS 300 may communicate using networking connection methods known in the art to create a subsequent data/power link between the powering IHS 200 and the powered IHS 300 that is configured to transmit data and power using, for example, PoE protocols, and that subsequent data/power link is detected by the power allocation engine 204 at block 508. The subsequent data/power link is distinguished in the embodiments discussed below from the initial data/power link in that it is provided between the powering IHS 200 and the powered IHS 300 at some time after the initial data/power link is provided. As discussed below, any number of subsequent data/power links may be detected and used similarly as discussed below with regard to the subsequent data/power link provided using the network cable 604.

As is known in the art, any two IHSs may be connected together using multiple network cables to provide multiple data links that may then be aggregated to form a link aggregation group (LAG) that increases the data throughput between the IHSs. However, as discussed above, current PoE specifications only provide for the transmission of power over a single Ethernet link, and when more than one link in a LAG is configured to provide power using PoE systems and components, conventional PoE systems operate to treat each of those links as distinct and separate PoE links that then operate to each provide the same amount of power to the powered IHS. This conventional operation leads to inefficient power allocation, and requires users to configure only one of the links in the LAG to provide power to the powered IHS, which can result in the powered IHS not receiving power if that link goes down. In some embodiments, the systems and methods of the present disclosure operate to extend the data link aggregation group concept to data/power links by grouping or aggregating multiple data/power links and distributing the power amount required by the powered IHS over those multiple data/power links such that power is provided to the powered IHS in a more efficient manner relative to conventional systems, and with a power redundancy that operates to power the powered IHS even if one or more of the data/power links goes down.

At block 510 of the method 500, the total power amount is provided to the powered IHS using a plurality of data/power links. In an embodiment, the power allocation engine 204 may allocate the total amount of power needed by the powered IHS 300, as determined at block 504 of the method 500, from the power system 210 and supply that total power amount to the port 206 that is connected to the initial data/power link and the port 306 that is connected to the subsequent data/power link such that the initial data/power link and the subsequent data/power link provide that total power amount to the powered IHS 300. For example, at block 510, the power allocation engine 204 may operate to create a powering link group that includes the initial data/power link and the subsequent data/power link by grouping the plurality of data/power ports 206 providing the initial data/power link and the subsequent data/power link into a powering port group, determine a power distribution for the total power amount needed by the powered IHS over the initial data/power link and the subsequent data/power link, and distribute the total power amount over initial data/power link and the subsequent data/power link to the powered IHS 300. As such, the total power amount provided to the powered IHS 300 using the plurality of data/power links may be the same total power amount that was determined at block 504. However, in some embodiments, the total power amount may change from that determined at block 504, and the total power amount provided to the powered IHS 300 using the plurality of data/power links may be a different total power amount than the total power amount that was determined at block 504. Additionally, data communication systems (not illustrated) in the powering IHS 200 may operate to transmit data to, and receive data from, the powered IHS 300 through the initial data/power link and the subsequent data/power link.

In different embodiments, the power distribution of the total power amount over the initial data/power link and the subsequent data/power link may include any distribution that is appropriate for the network cables 602 and 604, the powering IHS 200, and the powered IHS 300. For example, a portion of the total power amount needed by the powered IHS 300 may be distributed over the initial data/power link up to a maximum power transmission level of the network cable 602, and the remaining portion of the total power amount needed by the powered IHS 300 may then be distributed over the subsequent data/power link. In another example, the total power amount needed by the powered IHS 300 may be distributed evenly over the initial data/power link and the subsequent data/power link. As discussed above, each of the network cables 602 and 604 may be limited in the amount of power that they may transmit. In some embodiments, the power allocation engine 204 may take into account the maximum power transmission levels of the network cables used to provide the initial data/power link and the subsequent data/power link in determining how to distribute the total amount of power to the powered IHS 300 over the initial data/power link and the subsequent data/power link. For example, the power distribution of the total power amount needed by the powered IHS 300 may be distributed in percentages based on the maximum power transmission levels of the network cables 602 and 604 (e.g., if the network cable 602 has a maximum power transmission level of 15 watts and the network cable 604 has a maximum power transmission level of 30 watts, the total power amount needed by the powered IHS 300 may be distributed ⅓ to the initial data/power link (15 watts divided by the 45 watts available) and ⅔ to the subsequent data/power link (30 watts divided by the 45 watts available). While a few examples have been provided, one of skill in the art will recognize that the total power amount or power range distribution between the initial data/power link and any number of subsequent data/power links may be determined in a variety of different manners while remaining within the scope of the present disclosure.

The method 500 then proceeds to decision block 512 where it is determined whether at least one data/power link is unavailable. In an embodiment, the power allocation engine 204 operates to monitor the initial data/power link and the subsequent data/power link(s) to determine whether they are available to transmit power to the powered IHS 300. For example, the initial data/power link or the subsequent data/power link(s) may fail for any of a variety of reasons known in the art and, in response, cease transmitting power to the powered IHS 300, and the cessation of power transmission by the data/power link(s) may be detected by the power allocation engine 204. If at decision block 512, the power allocation engine 204 detects that at least one data/power link is unavailable, the method 500 proceeds to block 514 where the total power amount is provided to the powered IHS 300 using the remaining data/power link(s). In an embodiment, the power allocation engine 204 may reallocate the total amount of power needed by the powered IHS 300, as determined at block 504 of the method 500, from the power system 210 and supply that total power amount to the ports 206 that are connected to available data/power link(s) (e.g., the data/power links other than the one or more of the initial data/power link and the subsequent data/power link(s) that became unavailable at block 512) such that the available data/power link(s) provide that total power amount to the powered IHS 300. Similarly as discussed above with reference to block 510 for the distribution of the total power amount, the power redistribution of the total power amount over the remaining available data/power link(s) may include any distribution that is appropriate for the network cables 602 and 604, the powering IHS 200, and the powered IHS 300. As such, the redistribution of the total power amount to the powered IHS 300 may include the power allocation engine 204 ensuring that none of the data-power links will exceed a maximum power transmission level following the redistribution.

If, at block 512, the power allocation engine 204 does not determine that at least one data/power link is unavailable, or following block 514, the method 500 proceeds to decision block 516 where it is determined a maximum power transmission is exceeded. In an embodiment, the power allocation engine 204 operates to monitor each of the multiple data/power links that are providing power to the powered IHS 300 to determine whether a maximum power transmission level for any of the network cables providing those data/power links is exceeded. If at decision block 516, the power allocation engine 204 determines that a maximum power transmission is exceeded, the method 500 proceeds to block 518 where at least one of the data/power link(s) is disabled. In an embodiment, the power allocation engine 204 may operate at block 518 to disable the data/power link associated with the network cable for which the maximum power level was exceeded such that that data/power link and network cable no longer transmit power to the powered IHS 300. In some embodiments, the power allocation engine 204 may operate at block 518 to disable each of the data/power links providing power to the powered IHS 300 in response to determining that the maximum power transmission for a network cable has been exceeded.

If, at block 516, the power allocation engine 204 does not determine that a maximum power transmission level has been exceeded, or following block 518, the method 500 returns to decision block 508 where it is determined whether subsequent data/power links are detected. As such, the method 500 may operate to add further subsequent data/power links to the power link group such that the total amount of power needed by the powered IHS 300 may be distributed over any number of data/power links, and that total amount of power may be redistributed amongst available data/power links when any other data/power links become unavailable.

Figure 7:
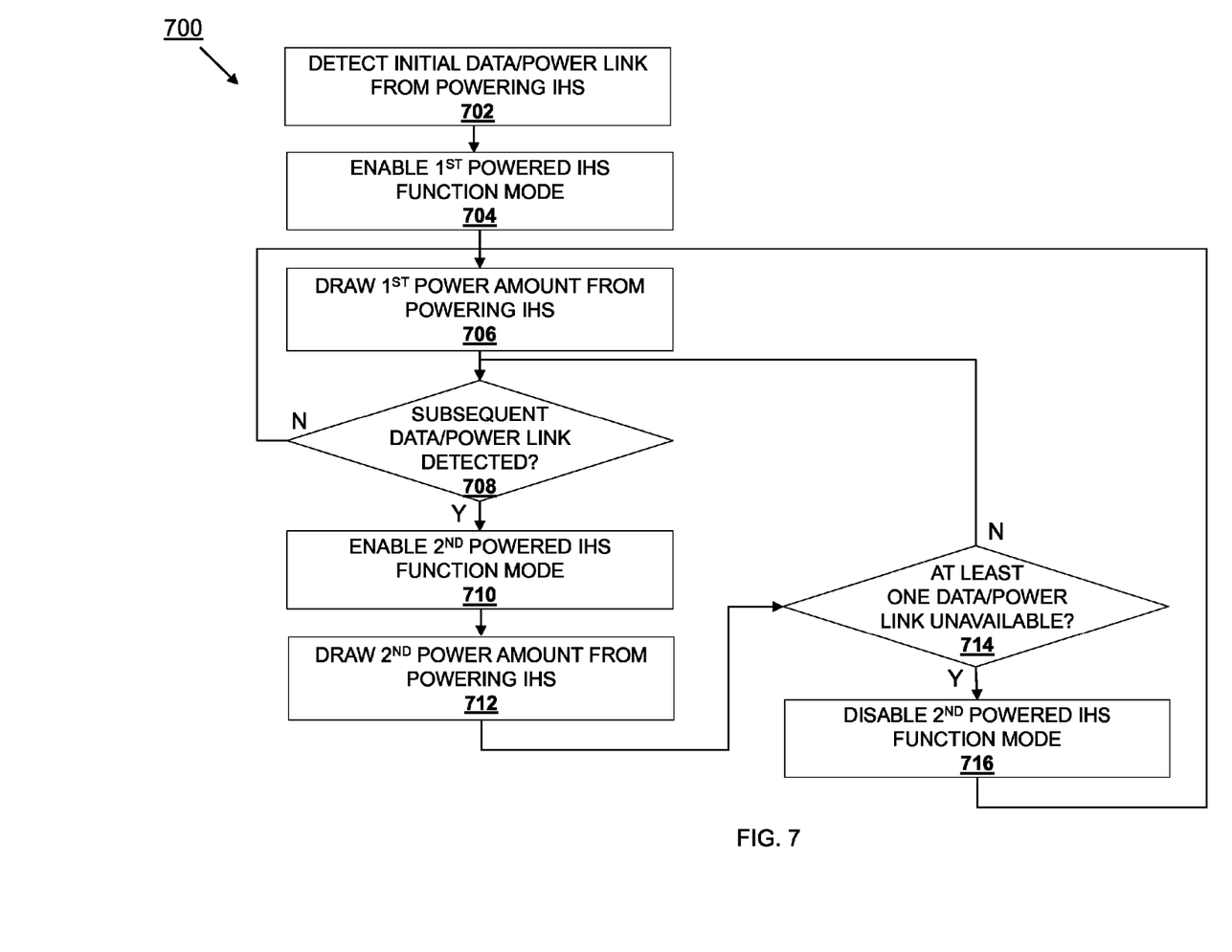
FIG. 7 is a flow chart illustrating an embodiment of a method for allocating power using multiple links.

Thus, systems and methods have been described that allow a powering IHS to provide power to a powered IHS over any number of multiple data/power links, while operating to reallocate power to one or more data/power links as data/power links become available or unavailable to transmit power. As such, rather than inefficiently provide the maximum amount of power over each data/power link based on the class of the powered IHS 300 detected via each link, as is done in conventional systems, or require a user to disable power provision over all but one of those data/power links, only the amount of power needed by the powered IHS 300 may be provided in any allocation over the multiple data/power links. Furthermore, such systems and methods enable power scaling that provides for the transmission of power amounts that are greater than those available due to the physical characteristic limitations of conventional single data/power links. One of skill in the art in possession of the present disclosure will recognize that, other than including conventional PoE capable systems, the powered IHS 300 need not include any non-conventional hardware and/or software systems to enable the performance of the method 500. In other words, the method 500 provides a new powering IHS that may operate to provide, distribute, and reallocate power over multiple data/power links to any conventional PoE-enabled powered IHS. However, one of skill in the art in possession of the present disclosure will recognize how the powered IHS 300 that operates according to the method 700, discussed below, may operate in that manner while the powering IHS 200 operates according to the method 500.

Referring now to FIGS. 6a, 6b, and 7, the method 700 begins at block 702 where an initial data/power link from the powering IHS is detected. In an embodiment of block 702, the powered IHS 300 may detect an initial data/power link from the powering IHS 200 in response to the connection of a cable to a port on the powering IHS 200 and a port on the powered IHS 300. For example, FIG. 6a illustrates an embodiment of a multiple link power allocation system 600 in which a network cable 602 such as, for example, an Ethernet cable, has been connected to a data/power port 206 on the powering IHS 200 and a data/power port 306 on the powered IHS 300 (e.g., using connectors on either ends of the network cable 602). In response to the connection of the network cable 602 to the data/power ports 206 and 306, the power allocation engine 204 in the powering IHS 200 and the function enablement engine 304 in the powered IHS 300 may communicate using networking connection methods known in the art to create an initial data/power link between the powering IHS 200 and the powered IHS 300 that is configured to transmit data and power using, for example, PoE protocols, and that initial data/power link is detected by the function enablement engine 304 at block 702. The initial data/power link is distinguished in the embodiments discussed below from subsequent data/power links in that it is the first data/power link between the powering IHS 200 and the powered IHS 300. However, similar functionality performed using the initial data/power link may be performed using any data/power link that is the only data power/link between the powering IHS 200 and the powered IHS 300 (e.g., due to the failure or unavailability of other data/power links, discussed below).

In an embodiment, in response to, or as part of, the detection of the initial data/power link, the function enablement engine 304 may operate to exchange and/or retrieve information with the powered IHS 300, monitor the port 306 to which the network cable 602 is connected, and/or otherwise determine a first power amount that is available from the powering IHS 200. As is known in the art, the powering IHS 200 may include hardware that operates to detect a class of the powered IHS 300 (e.g., via a resister in the powered IHS 300 that indicates a power range for the powered IHS 300) at block 504, which in PoE systems may include class 0 powered IHSs that operate in a power range of 0.44-12.94 watts, class 1 powered IHSs that operate in a power range of 0.44-3.84 watts, class 2 powered IHSs that operate in a power range of 3.84-6.49 watts, class 3 powered IHSs that operate in a power range of 6.49-12.95 watts, and class 4 powered IHSs that operate in a power range of 12.95.25.50 watts. As such, the powering IHS 200 may be operable to provide a first power amount to the powered IHS over the initial data/power link based on the detected class of the powered IHS 300.

The method 700 then proceeds to block 704 where a first powered IHS function mode is enabled. In an embodiment of block 704, the function enablement engine 304 may use the first power amount to provide a basic or minimum power required to power-on the first powered IHS and/or provide basic functions, as discussed above. For example, the powering IHS 200 may determine a fixed power amount needed by the powered IHS 300 to operate in a first powered IHS function mode (e.g., through a resistor in a powered IHS 300) that provide for basic functions of the powered IHS 300. As discussed below, following the provisioning of this fixed power amount to provide for the first powered IHS function mode (e.g., basic functions) in the powered IHS 300, other different IHS function modes may be dynamically selected. In an embodiment of block 704, the function enablement engine 304 may use the first power amount that it determined was available from the powering IHS 200 through the initial data/power link to determine which of the plurality of powered IHS function modes to enable. For example, if the first power amount available from the powering IHS 200 through the initial data/power link is approximately 15 watts, the function enablement engine 304 may operate to determine which, if any, of the powered IHS function modes requires 15 watts or less. Similarly, if the first power amount available from the powering IHS 200 through the initial data/power link is approximately 30 watts, the function enablement engine 304 may operate to determine which, if any, of the powered IHS function modes requires 30 watts or less. If there are no powered IHS function modes that are functional with the first power amount available from the powering IHS 200 through the initial data/power link, the function enablement engine 304 may operate to prevent operation of the any subsystems in the powered IHS 300. If more than one powered IHS function mode is functional with the first power amount available from the powering IHS 200 through the initial data/power link, the function enablement engine 304 may operate to enable the powered IHS function mode that most efficiently utilizes the first power amount (e.g., if a first power amount is 12 watts and two powered IHS function modes utilize 8 watts and 11 watts, respectively, the 11 watt powered IHS function mode may be enabled.) Referring back to FIG. 4, at block 704 the function enablement engine 304 may operate to determine that the first power amount available from the powering IHS 200 through the initial data/power link is sufficient to enable a first powered IHS function mode that provides only for operation of the camera system in the powered camera IHS 400 and does not provide for operation of the first moveable coupling 406 and the second moveable coupling(s) 410.

The method 700 then proceeds to block 706 where a first power amount is drawn from the powering IHS. In an embodiment, following the enablement of the first powered IHS function mode, one or more of the subsystems 312a-c in the powered IHS 300 operate to draw power from the powering IHS 200 through the initial data/power link such that powered IHS functions associated with the first powered IHS function mode may be performed. For example, referring to FIG. 4, the camera system in the powered camera IHS 400 may operate in the first powered IHS function mode to capture images, while the first moveable coupling 406 and the second moveable coupling(s) 410 do not operate in the first function mode.

The method 700 then proceeds to decision block 708 where it is determined whether a subsequent data/power link is detected. In an embodiment of decision block 708, the function enablement engine 304 may monitor the ports 306 on the powered IHS 300 to determine whether a network cable is connected to one of those ports 306 as well as a port on the powering IHS 200. If at decision block 708, the function enablement engine 304 determines that no subsequent data/power link has been detected, the method 700 returns to block 706 where the first power amount is drawn from the powering IHS 200 using the initial data/power link in substantially the same manner as discussed above. If at decision block 708, the function enablement engine 304 determines that a subsequent data/power link has been detected, the method proceeds to block 710.

In an embodiment of decision block 708, the powered IHS 300 may detect a subsequent data/power link to the powering IHS 200 in response to the connection of a cable to another port on the powering IHS 200 and another port on the powered IHS 300. For example, FIG. 6b illustrates an embodiment of the multiple link power allocation system 600 in which a network cable 604 such as, for example, an Ethernet cable, has been connected to another data/power port 206 on the powering IHS 200 (relative to the data/power port 206 connected to the network cable 602) and another data/power port 306 on the powered IHS 300 (relative to the data/power port 306 connected to the network cable 602). In response to the connection of the network cable 604 to the data/power ports 206 and 306, the power allocation engine 204 in the powering IHS 200 and the function enablement engine 304 in the powered IHS 300 may communicate using networking connection methods known in the art to create a subsequent data/power link between the powering IHS 200 and the powered IHS 300 that is configured to transmit data and power using, for example, PoE protocols, and that subsequent data/power link is detected by the function enablement engine 304 at block 708. The subsequent data/power link is distinguished in the embodiments discussed below from the initial data/power link in that it is provided between the powering IHS 200 and the powered IHS 300 at some time after the initial data/power link is provided. As discussed below, any number of subsequent data/power links may be detected and used similarly as discussed below with regard to the subsequent data/power link provided using the network cable 604.

As is known in the art, any two IHSs may be connected together using multiple network cables to provide multiple data links that may then be aggregated to form a link aggregation group (LAG) that increases the data throughput between the IHSs. However, as discussed above, current PoE specifications only provide for the transmission of power over a single Ethernet link, and when more than one link in a LAG is configured to provide power using PoE systems and components, conventional PoE systems operate to treat each of those links as distinct and separate PoE links that then operate to each provide the same amount of power. In some embodiments, the systems and methods of the present disclosure operate to detect multiple data/power links to enabled increasingly advanced IHS function modes as the power being supplied over additional data/power links becomes sufficient to power the subsystems used to provide those advanced IHS function modes.

In an embodiment, in response to or following the detection of the subsequent data/power link, the function enablement engine 304 may receive communications from the powering IHS 200 that describe the link aggregation group (LAG) applied to the initial data/power link and the subsequent power/data link. In some embodiments, the electrical parameters across the data/power links in the LAG provided by the powering IHS 200 may be the same for efficient load distribution. In one example, the powering IHS 200 may communicate Link Layer Discovery Protocol (LLDP) Extended Type-Length-Value structures (TLVs) to the powered IHS 300 that describe the LAG that includes the initial data/power link and the subsequent power/data link, and the powered IHS 300 may use those LLDP Extended TLVs to determine that additional power is available over the subsequent power/data link.

In an embodiment, in response to or as part of the detection of the subsequent data/power link, the function enablement engine 304 may operate to exchange and/or retrieve information with the powered IHS 300, monitor the port 306 to which the network cable 604 is connected, and/or otherwise determine an additional power amount that is available from the powering IHS 200. As discussed above, the powering IHS 200 may include hardware that operates to detect a class of the powered IHS 300 (e.g., via a resister in the powered IHS 300) that indicates a power range for the powered IHS 300) at block 504, which in PoE systems may include class 0 powered IHSs that operate in a power range of 0.44-12.94 watts, class 1 powered IHSs that operate in a power range of 0.44-3.84 watts, class 2 powered IHSs that operate in a power range of 3.84-6.49 watts, class 3 powered IHSs that operate in a power range of 6.49-12.95 watts, and class 4 powered IHSs that operate in a power range of 12.95.25.50 watts. As such, the powering IHS 200 may be operable to provide an additional power amount to the powered IHS over the subsequent data/power link based on the detected class of the powered IHS 300.

The method 700 then proceeds to block 710 where a second powered IHS function mode is enabled. In an embodiment of block 710, the function enablement engine 304 may use the additional power amount that was determined to be available from the powering IHS 200 through the subsequent data/power link to determine which of the plurality of powered IHS function modes to enable. For example, if the first power amount being provided by the powering IHS 200 through the initial data/power link is approximately 15 watts, and the additional power amount being provided by the powering IHS 200 through the subsequent data/power link is approximately 15 watts, the function enablement engine 304 may operate to determine which, if any, of the powered IHS function modes requires 30 watts or less. Similarly, if the first power amount being provided by the powering IHS 200 through the initial data/power link is approximately 30 watts, and the additional power amount being provided by the powering IHS 200 through the subsequent data/power link is approximately 30 watts, the function enablement engine 304 may operate to determine which, if any, of the powered IHS function modes requires 60 watts or less. If there are no powered IHS function modes available with the first power amount being provided by the powering IHS 200 through the initial data/power link and the additional power amount being provided by the powering IHS 200 through the subsequent data/power link, the function enablement engine 304 may operate to prevent operation of the any subsystems in the powered IHS 300.

If more than one powered IHS function mode is available with the first power amount being provided by the powering IHS 200 through the initial data/power link and the additional power amount being provided by the powering IHS 200 through the subsequent data/power link, the function enablement engine 304 may operate to enable the powered IHS function mode that most efficiently utilizes the first power amount and the additional power amount (e.g., if a first power amount and the additional power amount are a total of 49 watts and two powered IHS function modes utilize 48 watts and 37 watts, respectively, the 48 watt powered IHS function mode may be enabled.) If a powered IHS function mode is available that utilizes less power than the first power amount being provided by the powering IHS 200 through the initial data/power link and the additional power amount being provided by the powering IHS 200 through the subsequent data/power link, the function enablement engine 304 may operate to request less than the additional power amount (e.g., if a first power amount is 30 watts, the additional power amount is 15 watts, and the powered IHS function modes utilizes 35 watts, the function enablement engine 304 may request only 5 watts of the additional power amount provided over the subsequent data/power link.) For example, the function enablement engine 304 may request a required power amount that is less than the available additional power amount from the powering IHS 200 by sending an LLDP TLV via a Medium Dependent Interface (MDI). Referring back to FIG. 4, at block 710 the function enablement engine 304 may operate to determine that a second power amount (which may be some or all of the additional power amount) that is being provided by the powering IHS 200 through the subsequent data/power link is sufficient to enable a second powered IHS function mode that provides for operation of the camera system, the first moveable coupling 406, and the second moveable coupling(s) 410 in the powered camera IHS 400.

The method 700 then proceeds to block 712 where a second power amount is drawn from the powering IHS. In an embodiment, following the enablement of the second powered IHS function mode, one or more of the subsystems 312*a-c* in the powered IHS 300 operate to draw power from the powering IHS 200 through the initial data/power link and the subsequent data/power link such that powered IHS functions associated with the second powered IHS function mode may be performed. For example, referring to FIG. 4, the camera system in the powered camera IHS 400 may operate in the second powered IHS function mode to capture images, while the first moveable coupling 406 and the second moveable coupling(s) 410 operate to provide for movement about the ranges of motion A and B. As such, in some embodiments, the powered IHS 300 may detect the subsequent data/power link at decision block 708, but will not draw power from the data/power link immediately. Rather, the powered IHS 300 may determine the amount of power needed for a powered IHS function mode (e.g., the highest powered IHS function mode based on the power available), request that amount of power from the powering IHS 200 (e.g., via LLDP Extended TLV's), and then enable advanced features that operate to draw power that is transmitted over both the initial data/power link and the subsequent data/power link.

The method 700 then proceeds to decision block 714 where it is determined whether at least one data/power link is unavailable. In an embodiment, the function enablement engine 304 operates to monitor the initial data/power link and the subsequent data/power link(s) to determine whether they are available and transmitting power to the powered IHS 300. For example, the initial data/power link or the subsequent data/power link(s) may fail for any of a variety of reasons known in the art and, in response, cease transmitting power to the powered IHS 300, and the cessation of power transmission by the data/power link(s) will be detected by the function enablement engine 304. If at decision block 714, the function enablement engine 304 detects that at least one data/power link is unavailable, the method 700 proceeds to block 716 where the second powered IHS function is disabled. In an embodiment, the function enablement engine 304 may operate at block 716 to disable the second powered IHS function mode that was enabled at block 710. Referring back to FIG. 4, at block 716 the function enablement engine 304 may operate to determine that the second power amount (which may be some or all of the additional power amount) that was being provided by the powering IHS 200 through the subsequent data/power link is no longer available to enable the second powered IHS function mode that provides for operation of the camera system, the first moveable coupling 406, and the second moveable coupling(s) 410 in the powered camera IHS 400, and may disable the second powered IHS function mode such that the first powered IHS function mode is enabled that provides only for operation of the camera system in the powered camera IHS 400 and does not provide for operation of the first moveable coupling 406 and the second moveable coupling(s) 410. If the function enablement engine 304 does not detect that at least one data/power link is unavailable at decision block 714, the method returns to decision block 708 where it is determined whether a subsequent data/power link is detected.

In some embodiments, the determination that at least one data/power link is unavailable at decision block 714 may result in the function enablement engine 304 determining a different additional power amount that is available from the data/power links (e.g., when there are three or more data/power links and one or more data/power links become unavailable such that there are at least two data/power links that are available), and the function enablement engine 304 may select a powered IHS function mode that is appropriate for the first power amount and different additional power amount substantially as described above with reference to blocks 708 and 710. Furthermore, one of skill in the art in possession of the present disclosure will recognize that as subsequent data/power links are added between the powering IHS 200 and the powered IHS 300, further additional powered IHS function modes may be enabled by the powered IHS 300 such that power is drawn through each of those data/power links from the powering IHS 200.

Thus, systems and methods have been described that allow a powered IHS to efficiently utilize power provided by a powering IHS over any number of multiple data/power links, while operating to enable more advanced function modes as data/power links become available to transmit power, and disable those advanced function modes as data/power links become unavailable. Furthermore, such systems and methods enable power scaling that provides for the transmission of power amounts that are greater than those available due to the physical characteristic limitations of conventional single data/power links. In other words, the method provides a new powered IHS that may operate to detect that power is being provided over multiple data/power links by any conventional PoE-enabled powering IHS, and enable and/or disable powered IHS function modes depending on the amount of power available. However, one of skill in the art in possession of the present disclosure will recognize how the powering IHS 200 that operates according to the method 500, discussed above, may operate in that manner while the powered IHS 300 operates according to the method 700.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multiple link power allocation system, comprising:
 a powered IHS that includes a first plurality of data/power ports that are each configured to receive both data and power; and
 a powering IHS that includes a second plurality of data/power ports that are each configured to be directly connected to a respective one of the first plurality of data/power ports on the powered IHS by a respective networking cable that is configured to transmit both data and power to provide a plurality of data/power links with the powered IHS, wherein the powering IHS is configured to:
  detect an initial data/power link provided between the powering IHS and the powered IHS by a respective networking cable directly connected between a first of the first plurality of data/power ports and a first of the second plurality of data/power ports;
  determine a total power amount needed by the powered IHS;
  provide the total power amount to the powered IHS using the initial data/power link;
  detect, subsequent to the detection of the initial data/power link, at least one subsequent data/power link provided between the powering IHS and the powered IHS by a respective networking cable directly connected between each pair of a second of the first plurality of data/power ports and a second of the second plurality of data/power ports; and
  transmit data and provide at least a portion of the total power amount that is less than the total power amount to the powered IHS over the initial data/power link and each at least one subsequent data/power link.

2. The multiple link power allocation system of claim 1, wherein the powering IHS is configured to:
 create a powering link group that includes the initial data/power link and each at least one subsequent data/power link; and
 provide the total power amount to the powered IHS using the powering link group that includes the initial data/power link and each at least one subsequent data/power link.

3. The multiple link power allocation system of claim 1, wherein the powering IHS is configured to:
 determine the total power amount needed by the powered IHS using hardware that is configured to detect a class of the powered IHS using a resistor in the powered IHS that is configured to indicate a power range for the powered IHS.

4. The multiple link power allocation system of claim 1, wherein the powering IHS is configured to:
 detect that the initial data/power link has become unavailable; and
 provide the total power amount to the powered IHS using the at least one subsequent data/power link.

5. The multiple link power allocation system of claim 1, wherein the powering IHS is configured to:
 detect that a power transmission level associated with one of the plurality of a data/power links has exceeded a maximum power transmission level; and
 disable each of the plurality of data/power links.

6. The multiple link power allocation system of claim 1, wherein the powering IHS is configured to:
 determine the total power amount needed by the powered IHS using link layer discovery protocol (LLDP) messages received from the powered IHS.

7. The multiple link power allocation system of claim 1, wherein the powered IHS is configured to:
 detect the initial data/power link;
 enable a first powered IHS function mode and, in response, draw a first power amount through the initial data/power link;
 detect the at least one subsequent data/power link; and
 enable a second powered IHS function mode and, in response, draw a second power amount through the initial data/power link and the at least one subsequent data/power link that is greater than the first power amount.

8. The multiple link power allocation system of claim 7, wherein the powered IHS is configured to:
 detect that at least one of the plurality of data/power links is unavailable such that the second power amount may not be drawn through the initial data/power link and the at least one subsequent data/power link; and
 disable the second powered IHS function mode.

9. A powering information handling system (IHS), comprising:
 a first plurality of data/power ports that are each configured to transmit both data and power;
 a processing system that is coupled to the first plurality of data/power ports; and
 a memory system that is coupled to the processing system and that includes instructions that, when executed by the processing system, cause the processing system to provide a power allocation engine that is configured to:
  detect an initial data/power port of the first plurality of data/power ports that is directly connected to a respective one of a second plurality of data/power ports on a powered IHS by a respective networking cable that is configured to transmit both data and power;
  determine a total power amount needed by the powered IHS;
  provide the total power amount to the powered IHS using the initial data/power port;

detect, subsequent to the detection of the initial data/power port of the first plurality of data/power ports, at least one subsequent data/power port of the first plurality of data/power ports that is directly connected to a respective one of the at least one of the second plurality of data/power ports on the powered IHS; and transmit data and provide at least a portion of the total power amount that is less than the total power amount to the powered IHS through the initial data/power port and each at least one subsequent data/power port of the first plurality of data/power ports.

10. The powering IHS of claim 9, wherein the power allocation engine is configured to:

create a powering link group that includes the initial data/power port and each at least one subsequent data/power port of the first plurality of data/power ports; and provide the total power amount to the powered IHS using the powering link group that includes the initial data/power port and each at least one subsequent data/power port of the first plurality of data/power ports.

11. The powering IHS of claim 9, wherein the power allocation engine is configured to:

determine the total power amount needed by the powered IHS using hardware that is configured to detect a class of the powered IHS using a resistor in the powered IHS that is configured to indicate a power range for the powered IHS.

12. The powering IHS of claim 9, wherein the power allocation engine is configured to:

detect that the initial data/power port of the first plurality of data/power ports has become unavailable; and provide the total power amount to the powered IHS using the at least one subsequent data/power port of the first plurality of data/power ports.

13. The powering IHS of claim 9, wherein the power allocation engine is configured to:

detect that a power transmission level associated with one of the first plurality of data/power ports has exceeded a maximum power transmission level; and disable the one of the first plurality of data/power ports that has exceeded the maximum power transmission level.

14. A method for power allocation using multiple links, comprising:

detecting, by a powering IHS that includes a first plurality of data/power ports, an initial data/power link provided between the powering IHS and a powered IHS by a networking cable directly connected between a first of the first plurality of data/power ports and a first of a second plurality of data/power ports on the powered IHS;

determining, by the powering IHS, a total power amount needed by the powered IHS;

providing, by the powering IHS, the total power amount to the powered IHS using the initial data/power link;

detecting, by the powering IHS subsequent to the detection of the initial data/power link, at least one subsequent data/power link provided between the powering IHS and the powered IHS by a respective networking cable directly connected between each pair of a second of the first plurality of data/power ports and a second of the second plurality of data/power ports;

transmit, by the powering IHS, data over each of the plurality of data/power links provided between the powering IHS and the powered IHS via the respective networking cables; and providing, by the powering IHS, at least a portion of the total power amount that is less than the total power amount to the powered IHS over the initial data/power link and each at least one subsequent data/power link.

15. The method of claim 14, further comprising:

creating, by the powering IHS, a powering link group that includes the initial data/power link and each at least one subsequent data/power link; and providing, by the powering IHS, the total power amount to the powered IHS using the powering link group that includes the initial data/power link and each at least one subsequent data/power link.

16. The method of claim 14, wherein the determining the total power amount needed by the powered IHS includes:

detecting, by the powering IHS, a class of the powered IHS using a resistor in the powered IHS that is configured to indicate a power range for the powered IHS.

17. The method of claim 14, further comprising:

detecting, by the powering IHS, that the initial data/power link has become unavailable; and providing, by the powering IHS, the total power amount to the powered IHS using the at least one subsequent data/power link.

18. The method of claim 14, further comprising:

detecting, by the powering IHS, that a power transmission level associated with one of the plurality of a data/power links has exceeded a maximum power transmission level; and disabling, by the powering IHS, the one of the plurality of data/power links that has exceeded the maximum power transmission level.

19. The method of claim 14, further comprising:

detecting, by the powered IHS, the initial data/power link;

enabling, by the powered IHS, a first powered IHS function mode and, in response, drawing a first power amount through the initial data/power link;

detecting, by the powered IHS, the at least one subsequent data/power link; and enabling, by the powered IHS, a second powered IHS function mode and, in response, drawing a second power amount through the initial data/power link and the at least one subsequent data/power link that is greater than the first power amount.

20. The method of claim 19, further comprising:

detecting, by the powered IHS, that at least one of the plurality of data/power links is unavailable such that the second power amount may not be drawn through the initial data/power link and the at least one subsequent data/power link; and disabling, by the powered IHS, the second powered IHS function mode.

* * * * *